United States Patent
Omerbegovic

(10) Patent No.: US 11,034,287 B2
(45) Date of Patent: Jun. 15, 2021

(54) CONTROLLING A HEADLIGHT OF A MOTOR VEHICLE

(71) Applicant: AUDI AG, Ingolstadt (DE)

(72) Inventor: Said Omerbegovic, Frankfurt (DE)

(73) Assignee: AUDI AG, Ingolstadt (DE)

( * ) Notice: Subject to any disclaimer, the term of this patent is extended or adjusted under 35 U.S.C. 154(b) by 129 days.

(21) Appl. No.: 16/481,632

(22) PCT Filed: Feb. 13, 2018

(86) PCT No.: PCT/EP2018/053504
§ 371 (c)(1),
(2) Date: Oct. 7, 2019

(87) PCT Pub. No.: WO2018/149807
PCT Pub. Date: Aug. 23, 2018

(65) Prior Publication Data
US 2021/0107395 A1 Apr. 15, 2021

(30) Foreign Application Priority Data
Feb. 15, 2017 (DE) .................. 10 2017 202 466.6

(51) Int. Cl.
*B60Q 1/14* (2006.01)
*F21S 41/692* (2018.01)

(52) U.S. Cl.
CPC ............ *B60Q 1/143* (2013.01); *F21S 41/692* (2018.01); *B60Q 2300/056* (2013.01); *B60Q 2300/40* (2013.01)

(58) Field of Classification Search
CPC ................ B60Q 1/146; B60Q 2300/40; B60Q 2300/41; B60Q 2300/42; B60Q 2300/43;
(Continued)

(56) References Cited

U.S. PATENT DOCUMENTS 9,523,473 B2 * 12/2016 Ackermann ........... B60Q 1/085
2017/0008444 A1    1/2017 Bopp et al.

FOREIGN PATENT DOCUMENTS

DE    102008025808 A1    12/2009
DE    102009031087 A1     3/2010
(Continued)

OTHER PUBLICATIONS

International Search Report and Written Opinion of the International Searching Authority directed to related International Patent Application No. PCT/EP2018/053504, dated May 17, 2018, with attached certified English language translation: 22 pages.
(Continued)

*Primary Examiner* — Robert J May
(74) *Attorney, Agent, or Firm* — Sterne, Kessler, Goldstein & Fox P.L.L.C.

(57) ABSTRACT

The present disclosure relates to a method for controlling a headlight of a motor vehicle when a full beam function is activated, in which method an object is sensed by means of an object sensor, an evaluation unit determines whether the object is a road user, a light output in an object region of the object is reduced only if the object is a road user, a width of the object region is determined, two parallel side lines are determined centrally with respect to the width, the sidelines are moved outwards up to a predefinable maximum distance of the sidelines from one another, in opposite directions to one another and transversely with respect to their extent, wherein the maximum spacing is greater than the width of the object region, the sidelines are moved back as far as the transverse extent, and the headlight reduces the light output in a region which is bounded laterally by the sidelines.

16 Claims, 1 Drawing Sheet

(58) Field of Classification Search
CPC ............ B60Q 2300/45; B60Q 2300/47; B60Q 2300/056; F21S 41/60; F21S 41/62; F21S 41/64; F21S 41/645; F21S 41/657; F21S 41/663; F21S 41/67; F21S 41/675; F21S 41/68; F21S 41/683; F21S 41/686; F21S 41/689; F21S 41/692; F21S 41/695; F21S 41/698

See application file for complete search history.

(56) References Cited

FOREIGN PATENT DOCUMENTS

| | | |
|---|---|---|
| DE | 102012106502 A1 | 2/2014 |
| DE | 102012109068 A1 | 6/2014 |
| DE | 102015005587 A1 | 2/2016 |
| DE | 102014113478 A1 | 3/2016 |
| EP | 3088249 A1 | 11/2016 |
| JP | 5938276 B2 | 6/2016 |
| WO | WO 2015117604 A1 | 8/2015 |

OTHER PUBLICATIONS

International Preliminary Report on Patentability directed to related International Patent Application No. PCT/EP2018/053504, dated Jan. 31, 2019, with attached English language translation; 12 pages.

* cited by examiner

CONTROLLING A HEADLIGHT OF A MOTOR VEHICLE

TECHNICAL FIELD

The present disclosure relates to a method for controlling a headlight of a motor vehicle, in which light is emitted according to a light distribution corresponding to a full beam by means of the headlight with an activated full beam function, wherein an object in a region of the light output is detected by means of an object sensor, an evaluation unit determines whether the object is a road user and, only if the object is a road user, the light output is reduced in an object region of the object. In addition, the present disclosure relates to a device for controlling a headlight of a motor vehicle, wherein the device is designed to provide a control signal for the headlight, so that the headlight with an activated full beam function emits light according to a light distribution corresponding to a full beam, wherein the device is further designed to detect an object in a region of the light output by means of a sensor signal of an object sensor, to determine by means of an evaluation unit whether the object is a road user and, only if the object is a road user, to emit a control signal to the headlight to reduce the light output in an object region of the object. The present disclosure further relates to a driver assistance system for a motor vehicle and a motor vehicle.

BACKGROUND

Generic methods, devices which perform this generic method, driver assistance systems and motor vehicles are basically well known in the art. In particular during night driving, a driver of the motor vehicle can activate a full beam function in order to be able to illuminate a region of a traffic route to be traveled in the direction of travel in front of the motor vehicle in an improved manner, for example in order to be able to detect obstacles that are difficult to recognize in time. For this purpose, the full beam function can be activated manually.

If other road users are present in the illuminated region, they can be dazzled by the light which is emitted by the motor vehicle headlights according to a distribution of light for full beam. However, the dazzling of other road users should be avoided in principle, which is why the full beam function should be deactivated in such a case by the driver of the motor vehicle deactivating the full beam function manually.

Modern motor vehicles have increasingly adjustable headlights which make it possible to automatically shade or shield objects detected as other road users from glare when the full beam function is activated. For this purpose, a headlight control can be provided which controls the headlight in a suitable manner using an object recognition and evaluation.

A headlight as described above is also based on the teaching of WO 2015/117604 A1. This discloses a driver assistance system with a full beam control which uses camera sensors to detect lights from motor vehicles travelling in front or oncoming motor vehicles. If there is a risk of dazzling other road users detected in this way, the full beam is either switched off or adaptively controlled so that no glare can occur. The detection of motor vehicles travelling in front or oncoming motor vehicles is realized by means of different object sensors. In order to signal to the driver that an object is excluded in the beam of the full beam, an acoustic, visual or haptic signal is output to the driver.

DE 10 2015 005 587 A1 discloses a visualization of an illumination region in order to display the actually illuminated region to the driver when the full beam function is activated. For this purpose, an on-board display screen is used in the region of the driver of the motor vehicle to realize a corresponding display. Likewise, DE 10 2009 031 087 A1 discloses a display surface for displaying a headlight status in a motor vehicle. Furthermore, DE 10 2014 113 478 A1 discloses an illumination device of a motor vehicle and a method for operating the illumination device. Finally, EP 3 088 249 A1 discloses a method for operating a headlight device and a headlight device of a motor vehicle.

Although the prior art has proven itself, there is still room for improvement. In particular, the prior art relates to a display function that allows a corresponding display inside the motor vehicle to an on-board display screen. For this purpose, it is necessary that the driver keeps the screen permanently in view in order to obtain the information that the full beam has been shielded from the other road user. This distracts the driver from actually driving the motor vehicle and is therefore unfavorable.

BRIEF DESCRIPTION OF THE DRAWINGS/FIGURES

DETAILED DESCRIPTION

Figure 1:
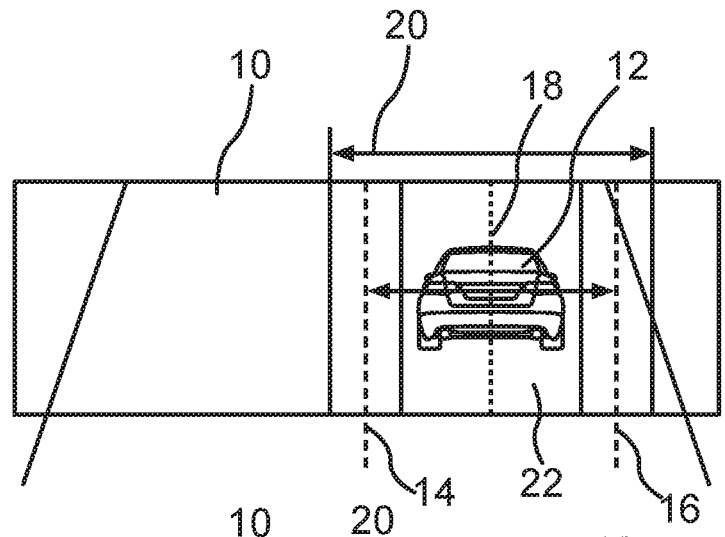
FIG. 1 shows a schematic representation of a movement of sidelines, in accordance with some embodiments.

The present disclosure is thus based on the object of further improving the function of shading or shielding other road users from glare when the full beam function of the motor vehicle is activated, in particular for the driver.

As a solution, the present disclosure proposes a method, a device, a driver assistance system and a motor vehicle according to the independent claims.

The features of the dependent claims relate to advantageous developments.

In some embodiments, a method is disclosed to reduce the light output in the object region of the object. The method comprises determining a width of the object region, and two parallel sidelines centrally with respect to the width, where the sidelines are moved outwards up to a predefinable maximum spacing of the sidelines from one another, in opposite directions from one another and transversely with respect to their extent, wherein the maximum spacing is greater than the width of the object region. After the maximum spacing is reached the sidelines are moved towards each other in opposite directions until the sidelines reach the width of the object region, and the headlight is controlled in such a way that the light output is reduced in a region which is bounded laterally by the sidelines.

In some embodiments, a device designed to determine a width of the object region to reduce the light output in the object region of the object is disclosed. The device is further designed to determine two parallel sidelines centrally with respect to the width, and to move the sidelines outwards up to a predefinable maximum spacing of the sidelines from one another, in opposite directions from one another and transversely with respect to their extent, wherein the maximum spacing is greater than the width of the object region, after the maximum spacing is reached, to move the sidelines in opposite directions to each other until the sidelines reach the width of the object region, and to control the headlight by means of the control signal such that the light output is reduced in a region which is bounded laterally by the sidelines.

With regard to a generic driver assistance system, it is proposed in particular that this comprises a device according to some embodiments as described herein.

In some embodiments, a motor vehicle comprising a device according to some embodiments as described herein or a driver assistance system according to some embodiments as described herein.

The present disclosure is based on the idea that, when a further road user is recognized, with an activated full beam function of the motor vehicle, shading or shielding of the road user from glare is provided with an effect that is visually recognizable to the driver of the motor vehicle, whereby the driver of the motor vehicle receives the information that the function of shading or shielding from glare is also activated and works when the full beam function is activated. The driver of the motor vehicle therefore does not need to concentrate on any further displays in the region of the motor vehicle, in particular, of the dashboard of the motor vehicle, and can focus his attention essentially on driving the motor vehicle in the intended driving operation. Thus, contrary to the prior art, he does not need to constantly keep an eye on a screen, but he can concentrate completely on the traffic situation. By the effect for shading or shielding the other road users from glare, the driver thus automatically obtains the functional effect of the function of shading or shielding from glare. Therefore, no further on-board display devices are required that represent the appropriate functionality. These can be dispensed with.

With the present disclosure as described herein, while driving the motor vehicle in the intended driving operation, with the full beam function activated, even under unfavourable circumstances, the driver is able to distinguish the shading or shielding from glare from a full beam which cannot be shaded or shielded from glare, because the shading or shielding from glare is directly visually experienced. The driver of the motor vehicle, therefore, does not need to fear that other road users are dazzled. In this respect, there is no reason for the driver of the motor vehicle to completely deactivate the full beam function. As a result, the safety with respect to the driving of the motor vehicle can be significantly improved.

Thus the activation of the shading or shielding from glare with the full beam function activated is apparent to the driver. He knows that the function is activated and other road users are shaded or shielded from glare as needed. Then he does not need to abandon the full beam function.

In some embodiments, the glare-free full beam or the shading or shielding from glare can be based on the detection of other road users by a sensor, namely an object sensor, which may have, for example, a camera or the like. Preferably, corresponding data are transmitted from the object sensor, in particular, the camera, to an evaluation unit, for example, a processing control unit for light functions, in particular, a headlight control function, for example, via a communication link, which may be formed, for example, by a BUS system or the like. The data may include a classification, a distance, vertical object boundaries, a transverse extent, and/or the like.

In some embodiments, if an object is relevant for shading or shielding from glare, because it has been recognized in particular as a further road user, two vertical light-dark boundaries can be provided by means of sidelines, in particular virtual sidelines. The sidelines are initially positioned centrally with respect to the width of the object region, in particular between object boundaries of the object. In a parameterizable time, the sidelines can be moved outwards to a value, for example, given by an object boundary plus an offset or the like, and moved back in a further parameterizable time from this value to a value of the object boundary. As a result of this dynamic movement of the light-dark region in the region of the full beam function, the driver immediately receives feedback that the functionality with respect to shading or shielding from glare is activated and at the same time he can visually comprehend that the further road user has been correctly shaded or shielded from glare.

In some embodiments, the adjustable headlight is preferably a pixel headlight. A pixel headlight is a headlight that has a plurality of pixels that can preferably emit light individually. By means of the headlight control, the light output of the individual pixels can be controlled. The pixels of the pixel headlight are preferably arranged in the manner of a matrix. A pixel is usually formed by a light element, which can be controlled individually by the headlight control with respect to its light output. The control of the light elements can be done individually substantially independently of each other, so that almost any light distributions can be provided by means of the pixel headlight. Thus, a highly flexible light distribution with respect to the light output of the pixel headlight can be achieved. The light element can, for example, be a light-emitting diode, a laser diode, but basically also a glow lamp, a gas discharge lamp, combinations thereof or the like. In addition, the pixels of the pixel headlight can also be provided by a luminescent material which can be activated point by point and/or line by line for light output by means of a laser light beam of a laser light source. The conversion substance in this case provides the pixels of the pixel headlight. In such a headlight, it may also be provided that the pixels merge into each other almost without limit, for example, due to a corresponding control by the laser. Such a headlight is also referred to as a laser scanner.

In some embodiments, the object sensor may include a camera, a radar sensor, an infrared sensor, combinations thereof and/or the like. By means of the object sensor, an object in the range of the light output can be detected. The range of the light emission is a region in which the headlight emits its light, preferably a region bounded by a solid angle. In particular, the object sensor can detect at least the range of the light output. The range of the light output is further determined by the fact that it can be acted upon by the headlight with light. In addition, however, it may be provided that the object sensor only detects an object which is arranged on a traffic route, in particular, a traffic route on which the motor vehicle itself is also located. Thus, within the meaning of this disclosure "arranged" not only means positioned, but also includes a temporal change of position or a movement.

In some embodiments, the object sensor is preferably designed such that other road users can be detected with it, preferably those who also use the traffic route. The object sensor is connected via a communication link to the evaluation unit, which evaluates sensor signals of the object sensor and determines whether the object is a road user. For this purpose, known methods of evaluation can be used, by means of which, for example, other motor vehicles, persons, cyclists and/or the like can be detected as other road users. Preferably, a classification is provided in this regard. The classification may include at least the class of road users and non-road users. In addition, the classification of road users can also be further subdivided into motor vehicles, persons, cyclists and/or the like. The object sensor may also provide data for an object position, one or more object dimensions, which may be merged into image data by which a corresponding traffic situation can be virtually presented, so that it may be submitted for data processing.

In some embodiments, the evaluation unit supplies an evaluation signal to the headlight control or provides the control signal for the headlight directly. By means of the headlight control, the headlight can then be controlled according to need in order to be able to achieve a shading or shielding of the object from glare in an object region of the object by reducing the light output.

For example, the object region is a region determined by dimensions of the object. In some embodiments, it may also include, for example, a near region formed a few centimeters to one or more meters around the object itself. In the case of image data, it may be provided that the object region additionally also includes one or more pixels around the detected object. The light output is reduced if the object was detected as a road user. The reduction of the light is preferably restricted at least to the object region. Outside the object region, the illumination function according to the activated full beam function can thus continue to exist, at least partially.

The width of the object region means, in particular, a transverse extent of the object region from the perspective of the motor vehicle, for example horizontally. This can, for example, refer to the image data. The width may preferably be a horizontal width. In particular, it may be independent of an inclination of the motor vehicle and/or of the object. The transverse extent may preferably be oriented horizontally.

In some embodiments, the device of the present disclosure detects two parallel sidelines centrally with respect to the width of the object region. Preferably, the sidelines are oriented perpendicular to an orientation of the width. Most preferably, however, the sidelines are vertically oriented. The sidelines may be virtual sidelines that serve to define a light-dark boundary with respect to the light output by the headlight. In this respect, they can be represented by appropriate data. On the basis of the sidelines thus determined, a control signal is emitted by the device to the headlight control, which in turn controls the light output of the headlight accordingly. As a result, visually recognizable light-dark boundaries assigned to the sidelines are generated so that the driver can directly recognize a region between the sidelines which is shaded or shielded from glare.

To provide the effect of improved detection, in some embodiments, the two parallel vertical sidelines are moved outwards in opposite directions to each other and transversely with respect to their extent up to a predefinable maximum spacing of the sidelines from each other. The predefinable maximum spacing is greater than a transverse extent of the object or of the object region, so that when the maximum spacing is reached, the object is positioned between the sidelines. After reaching the maximum spacing, the sidelines are then moved towards each other in opposite directions until the transverse extent of the object is reached. The sidelines are thus brought laterally back to the object from the maximum spacing until a respective lateral object boundary is reached by the sideline. In the region between the sidelines, the light output of the headlight is reduced appropriately by controlling the headlight control, preferably also during the movement of the sidelines.

In some embodiments, the maximum spacing can be predetermined, for example, by a roadway width of a roadway on which the object is located. This may be the same roadway on which the motor vehicle is located. The roadway is at least part of the traffic route. It can be provided that the traffic route comprises only a single roadway. In addition, several roadways or lanes may be provided on which traffic is allowed either only in one direction or in the opposite direction. In this case, for example, a marking of the roadway can be used to determine the roadway width. In particular, a side marking or a center marking on two roadways can be used to determine the roadway width. In addition, a distance of the object from the motor vehicle can be taken into account in order to determine, for example, a perspective shift in the width of the roadway in order to determine the maximum spacing. As a result, it is possible to avoid moving the sidelines excessively outwards and thus a large, at least poorly illuminated region is created for the driver of the motor vehicle. Since the distance to the object and its virtual object transverse extent at the location of the motor vehicle is detected, an optimized process control can be achieved.

In order to reduce the light output in the object region of the object, the method according to some embodiments may determine two parallel vertical sidelines centrally with respect to the object. The sidelines are moved outwards up to a predefinable maximum spacing of the sidelines from one another, in opposite directions to one another and transversely with respect to their extent, wherein the maximum spacing is greater than a horizontal transverse extent of the object region, after reaching the maximum spacing, the sidelines are moved towards each other in opposite directions until the sidelines reach the transverse extent of the object region, and the headlight is controlled such that the light output is reduced in a region which is bounded laterally by the sidelines.

To reduce the light output in the object region of the object, the device according to some embodiments may determine two parallel vertical sidelines centrally with respect to the object, to move the sidelines outwards up to a predefinable maximum spacing of the sidelines from one another, in opposite directions from one another and transversely with respect to their extent, wherein the maximum spacing is greater than a horizontal transverse extent of the object region, to move the sidelines in opposite directions to each other after reaching the maximum spacing until the sidelines reach the transverse extent of the object region, and to control the headlight by means of the control signal such that the light output is reduced in a region which is bounded laterally by the sidelines.

In some embodiments, the moving of the sidelines takes place in a predefinable time period. The predefinable time period can be, for example, about 0.5 s, about 0.8 s, about 1 s or even more. Preferably, however, the predefinable time period is less than about 2 s, in particular less than about 1.5 s.

In some embodiments, the time period is predetermined as a function of a distance between the motor vehicle and the object and/or a speed difference between the motor vehicle and the object. This allows specific features to be better utilized during normal operation. Thus, it can be provided that the predefinable time period can be adjusted as needed during normal operation of the motor vehicle, preferably with respect to a respective function of shading or shielding from glare.

Furthermore, it is proposed that the sidelines are moved outwards faster than inwards. Thus, it can be provided that the sidelines are moved outwards from the central position of the object to the maximum spacing for a very short time period, for example in a time that is less than about 0.4 s, preferably less than about 0.2 s.

From the maximum spacing, the sidelines can then preferably be moved more slowly inwards, for example in a time period that is greater than about 0.2 s, preferably greater than about 0.3 s. As a result, a dynamically well recognizable function of shielding from glare can be achieved for the driver. It may also be provided that the speeds of moving the sidelines can be set individually, so that the driver can adjust the function for his personal needs as needed.

In some embodiments, an alignment of the sidelines centrally with respect to the object is updated. As a result of the updating, a change in the relative position of the object with respect to the motor vehicle can be better taken into account and in this way the region which is shaded or shielded from glare can be better adapted to the current situation. As a result, improved shading or shielding of the other road users from glare can be achieved.

In some embodiments, the headlight is controlled so that the light is emitted exclusively outside the region between the sidelines. No light is emitted between the sidelines in this embodiment, so that a decidedly favorable shading or shielding of the other road users from glare can be achieved. Otherwise, it can also be provided that in the region between the sidelines, for example, a low beam function is realized.

The effects and advantages stated with regard to the method according to the embodiments as described herein may apply equally to the device according to the invention and to the driver assistance system equipped with the device according to the embodiments as described herein and to the motor vehicle equipped with the device according to the embodiments as described herein or the driver assistance system according to the embodiments as described herein and vice versa. Thus, device features can also be formulated for method features and vice versa.

The present disclosure also includes refinements of the method according to the embodiments as described herein, which include features such as those that were previously described in connection with the refinements of the motor vehicle according to the embodiments as described herein. For this reason, the corresponding refinements of the method according to the embodiments as described herein are not described again.

Exemplary embodiments are described below with reference to the drawings.

The exemplary embodiments explained below are preferred embodiments in which the described components of the embodiments each constitute individual features to be considered independently of one another, or in a combination different from that shown. In addition, features can be added to the embodiments described.

In the drawings, elements with the same function have been provided with the same reference signs.

FIG. 1 shows a schematic representation of a movement of sidelines outwards from a central position of an object detected as a road user up to a maximum spacing, in accordance with some embodiments. FIG. 1 shows a schematic representation of a vehicle 12 travelling in front as an object on a roadway 22 of a road (not further designated) as a traffic route. A separate motor vehicle, which is likewise driven by a driver of the motor vehicle on the roadway 22 behind the motor vehicle, is not shown in the figures.

The separate motor vehicle likewise has, as a headlight, a pixel headlight (likewise not shown) which is controlled by means of a headlight control (likewise not shown) in terms of its light output. In the present case, the pixel headlight is controlled in such a way that the pixel headlight emits light 10 in accordance with an activated full beam function. The light 10 has a corresponding light distribution for this purpose.

The motor vehicle 12 is detected in the region of the light output of the light 10 by means of a camera (not shown) of the separate motor vehicle, which in the present case serves as an object sensor. The camera is connected to an evaluation unit (likewise not shown) of the separate motor vehicle, which determines whether the object 12 is a road user. In the present case, the evaluation unit determines that the object is the motor vehicle 12.

The evaluation unit is connected to a headlight control, by means of which the light output of the light 10 can be controlled by the pixel headlight. In accordance with a control signal, the light output is reduced by the pixel headlight in an object region of the motor vehicle 12 for shielding the motor vehicle 12 from glare.

To reduce the light output in the region of the motor vehicle 12, two parallel vertical sidelines 14, 16, which in the present case are virtual sidelines, are initially determined centrally with respect to the motor vehicle 12. The sidelines 14, 16 serve to be able to predetermine light-dark boundaries in the region of the light output by the pixel headlight. Accordingly, the evaluation unit outputs the control signal to the headlight control. In this case, the pixel headlight is controlled by means of the headlight control such that, in a region between the sidelines 14, 16, the light output of the light 10 is reduced. In the present case it is provided that no light is emitted in this region between the sidelines 14, 16.

Then, the sidelines 14, 16 are moved outwards up to a predefinable maximum spacing 20 of the sidelines 14, 16 from each other, in opposite directions to one another and transversely with respect to their extent. The maximum spacing 20 is greater than a transverse extent of the motor vehicle 12. In the present case, it is provided that the maximum spacing 20 corresponds to a roadway width of the roadway 22 in the region of the position of the motor vehicle 12. In addition, of course, other standards may be predetermined for the maximum spacing 20. The width of the roadway 22 in the region of the position of the motor vehicle 12 can also be determined by means of the evaluation unit.

Figure 2:
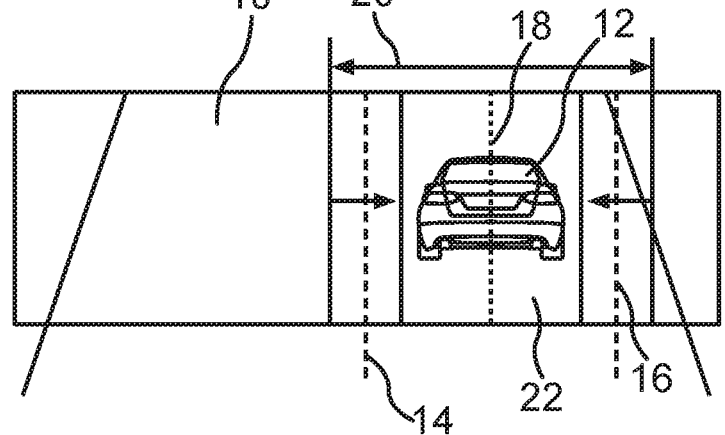
FIG. 2 shows a schematic representation of a movement of sidelines, in accordance with some embodiments.

FIG. 2 shows a schematic representation of a movement of sidelines inwards from the maximum spacing to the object, in accordance with some embodiments. FIG. 2 shows the movement of the sidelines 14, 16 inwards from their maximum spacing 20. Since the sidelines 14, 16 determine light-dark boundaries of the light output of the light 10 by the pixel headlight, a dark zone in the region of the motor vehicle 12 is visually recognizable to the driver. As a result of the movement of the sidelines 14, 16, the corresponding associated light-dark boundary is also moved at the same time, so that this is immediately recognizable to the driver of the separate motor vehicle.

Figure 3:
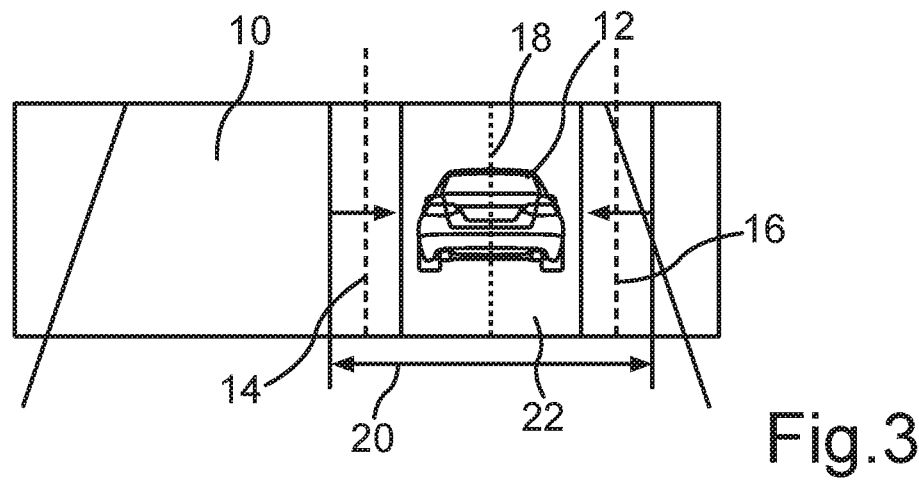
FIG. 3 shows a schematic representation of a movement of sidelines, in accordance with some embodiments.

After the maximum spacing 20 is reached by the sidelines 14, 16, they are moved towards each other in opposite directions until a transverse extent of the motor vehicle 12 is reached. This is shown in FIG. 3. FIG. 3 shows a schematic representation of a movement of sidelines that have reached horizontal object boundaries of the object, in accordance with some embodiments.

In the present embodiment, it is provided that about 0.5 s are provided as a time period for moving the sidelines 14, 16. It is further provided that the sidelines 14, 16 move faster outwards than inwards. In the present case, the sidelines 14, 16 are moved outwards within about 0.2 s. The movement inwards then immediately follows and takes place over a time period of about 0.4 s.

The method as described herein in accordance with some embodiments may permanently repeated so that changes in the relative positioning of the motor vehicle can be tracked. As a result, the function of shading or shielding from glare can be permanently reliably ensured even in the event of relative changes. Thus, it can be provided that the determination of the vertical center line 18 of the motor vehicle 12 is repeated at a constant rate of about 0.1 s or more, for example about 0.2 s. It can be provided that the process control is adjusted according to the embodiments as described herein only by adjusting the center line 18 as a whole and is otherwise continued in the sense of the process control according to the embodiments as described herein.

In addition, of course, it can also be provided that, in particular if a relative spacing between the separate motor vehicle and the motor vehicle 12 changes and the motor vehicle 12 thus requires, for example, a larger or a smaller region of the shading from glare, the process control is adjusted accordingly. This may be performed, for example, at a rate of about 0.6 s or more, for example about 0.8 s or about 1 s, or the like. As a result, on the one hand, the function of shading or shielding from glare is still ensured, wherein, on the other hand, at the same time the shading or shielding from glare takes place only to the extent necessary for the motor vehicle 12. As a result, unnecessary restrictions on the illumination with regard to the driver of the separate motor vehicle can be largely reduced.

Overall, the evaluation unit and possibly also the headlight control can be at least partially formed by a computer unit. The computer unit is controlled by means of a computer program such that it is able to provide the desired functionality. In addition, of course, it can also be provided that at least partially a hardware circuit is provided, which at least partially provides the desired functionality. Of course, the hardware circuit can also be combined with a computer unit. In particular, of course, the headlight control, the evaluation unit and the device according to the invention may be at least partially integrated into a higher-level vehicle control of the motor vehicle.

Finally, it is also possible for the object sensor, the evaluation unit, the device according to the embodiments as described herein and other components to be integrated with one another in a wide variety of ways in order to be able to access demand-oriented units for integration into the motor vehicle or into the driver assistance system.

Overall, the examples show how an improved functionality of shading or shielding from glare with an activated full beam function for the driver of a motor vehicle may be achieved.

The embodiments described herein are merely illustrative and are not intended to limit it.

The invention claimed is:

1. A method for controlling a headlight of a motor vehicle, the method comprising:
   detecting, using a sensor of the motor vehicle, an object in a region of light output;
   determining a type of the object in the region of the light output;
   in response to a determination that the detected object is a road user, determining a width of an object region of the object;
   determining two parallel sidelines centrally according to the width of the object region, wherein the two parallel sidelines serve to provide vertical light-dark boundaries to define a light-dark boundary with respect to the light output by the headlight;
   moving the two parallel sidelines outwards, in opposite directions to one another and transversely with respect to their extent, up to a configurable maximum spacing of the two parallel sidelines from each other, wherein the configurable maximum spacing is greater than the width of the object region;
   upon spacing between the two parallel sidelines reaching the configurable maximum spacing of the two parallel sidelines, moving the two parallel sidelines towards each other in opposite directions until the two parallel sidelines reach the width of the object region; and
   controlling the headlight to emit light according to a light distribution corresponding to activation of a full beam of the headlight, and to reduce the light output in a region bounded laterally by the two parallel sidelines, thereby reducing the light output in the object region.

2. The method of claim 1, wherein the configurable maximum spacing of the two parallel sidelines is based on a roadway width of a roadway on which the object is located.

3. The method of claim 1, further comprising moving the two parallel sidelines outwards or towards each other in a configuable time period.

4. The method of claim 3, wherein the configuable time period is a function of at least one of a distance between the motor vehicle and the object, and a speed difference between the motor vehicle and the object.

5. The method of claim 1, wherein moving the two parallel sidelines outwards is faster than moving the two parallel sidelines towards each other.

6. The method of claim 1, further comprising updating an alignment of the two parallel sidelines centered to the object.

7. The method of claim 1, further comprising controlling the headlight to emit light exclusively outside the region bounded laterally by the two parallel sidelines.

8. A device for controlling a headlight of a motor vehicle, the device is configured to:
   detect, using a sensor of the motor vehicle, an object in a region of light output;
   determine a type of the object in the region of the light output;
   in response to a determination that the detected object is a road user, determine a width of an object region of the object;
   determine two parallel sidelines centrally according to the width of the object region, wherein the two parallel sidelines serve to provide vertical light-dark boundaries to define a light-dark boundary with respect to the light output by the headlight;
   move the two parallel sidelines outwards, in opposite directions to one another and transversely with respect to their extent, up to a configurable maximum spacing of the two parallel sidelines from each other, wherein the configurable maximum spacing is greater than the width of the object region;
   upon spacing between the two parallel sidelines reaching the configurable maximum spacing of the two parallel sidelines, move the two parallel sidelines towards each other in opposite directions until the two parallel sidelines reach the width of the object region; and
   provide a control signal to control the headlight to emit light according to a light distribution corresponding to activation of a full beam of the headlight, and to reduce the light output in a region bounded laterally by the two parallel sidelines,
   thereby reducing the light output in the object region.

9. The device of claim 8, wherein the configurable maximum spacing of the two parallel sidelines is based on a roadway width of a roadway on which the object is located.

10. The device of claim 8, further configured to move the two parallel sidelines outwards or towards each other in a configuable time period.

11. The device of claim 10, wherein the configuable time period is a function of at least one of a distance between the motor vehicle and the object, and a speed difference between the motor vehicle and the object.

12. The device of claim 8, wherein moving the two parallel sidelines outwards is faster than moving the two parallel sidelines towards each other.

13. The device of claim 8, further configured to update an alignment of the two parallel sidelines centered to the object.

14. The device of claim 8, further configured to provide another control signal to control the headlight to emit light exclusively outside the region bounded laterally by the two parallel sidelines.

15. A driver assistance system for a motor vehicle, comprising:
a device for controlling a headlight of a motor vehicle, the device configured to:
detect, using a sensor of the motor vehicle, an object in a region of light output;
determine a type of the object in the region of the light output;
in response to a determination that the detected object is a road user, determine a width of an object region of the object;
determine two parallel sidelines centrally according to the width of the object region, wherein the two parallel sidelines serve to provide vertical light-dark boundaries to define a light-dark boundary with respect to the light output by the headlight;
move the two parallel sidelines outwards, in opposite directions to one another and transversely with respect to their extent, up to a configurable maximum spacing of the two parallel sidelines from each other, wherein the configurable maximum spacing is greater than the width of the object region;
upon spacing between the two parallel sidelines reaching the configurable maximum spacing of the two parallel sidelines, move the two parallel sidelines towards each other in opposite directions until the two parallel sidelines reach the width of the object region; and
provide a control signal to control the headlight to emit light according to a light distribution corresponding to activation of a full beam of the headlight, and to reduce the light output in a region bounded laterally by the two parallel sidelines,
thereby reducing the light output in the object region.

16. A motor vehicle, comprising at least one of a device and a driver assistance system comprising the device,
wherein the device is configured to:
detect, using a sensor of the motor vehicle, an object in a region of light output;
determine a type of the object in the region of the light output;
in response to a determination that the detected object is a road user, determine a width of an object region of the object;
determine two parallel sidelines centrally according to the width of the object region, wherein the two parallel sidelines serve to provide vertical light-dark boundaries to define a light-dark boundary with respect to the light output by the headlight;
move the two parallel sidelines outwards, in opposite directions to one another and transversely with respect to their extent, up to a configurable maximum spacing of the two parallel sidelines from each other, wherein the configurable maximum spacing is greater than the width of the object region;
upon spacing between the two parallel sidelines reaching the configurable maximum spacing of the two parallel sidelines, move the two parallel sidelines towards each other in opposite directions until the two parallel sidelines reach the width of the object region; and
provide a control signal to control the headlight to emit light according to a light distribution corresponding to activation of a full beam of the headlight, to and reduce the light output in a region bounded laterally by the two parallel sidelines,
thereby reducing the light output in the object region.

* * * * *